(12) United States Patent  
Bian et al.

(10) Patent No.: US 8,580,409 B2
(45) Date of Patent: Nov. 12, 2013

(54) PERPENDICULAR MAGNETIC RECORDING MEDIA HAVING A DUAL ONSET LAYER

(75) Inventors: Xiaoping Bian, Saratoga, CA (US); Jack Jyh-Kau Chang, Freemont, CA (US); Zhupei Shi, San Jose, CA (US)

(73) Assignee: HGST Netherlands B.V., Amsterdam (NL)

( * ) Notice: Subject to any disclaimer, the term of this patent is extended or adjusted under 35 U.S.C. 154(b) by 376 days.

(21) Appl. No.: 12/614,598

(22) Filed: Nov. 9, 2009

(65) Prior Publication Data

US 2011/0111261 A1 May 12, 2011

(51) Int. Cl.
G11B 5/66 (2006.01)
G11B 5/65 (2006.01)
G11B 5/73 (2006.01)
G11B 5/738 (2006.01)

(52) U.S. Cl.
CPC .. *G11B 5/66* (2013.01); *G11B 5/65* (2013.01); *G11B 5/7325* (2013.01); *G11B 5/738* (2013.01)
USPC ............................ 428/829; 428/830; 428/831

(58) Field of Classification Search
None
See application file for complete search history.

(56) References Cited

U.S. PATENT DOCUMENTS

| 5,851,643 | A * | 12/1998 | Honda et al. ................. 428/212 |
| 6,426,157 | B1 * | 7/2002 | Hokkyo et al. ............... 428/827 |
| 6,610,424 | B1 * | 8/2003 | Acharya et al. .............. 428/830 |
| 7,038,873 | B2 * | 5/2006 | Shimazaki et al. ............ 360/59 |
| 7,465,501 | B1 | 12/2008 | Lee et al. |
| 7,842,409 | B2 * | 11/2010 | Girt .............................. 428/828.1 |
| 2003/0096140 | A1 | 5/2003 | Tomiyasu et al. |
| 2004/0219329 | A1 * | 11/2004 | Oikawa et al. ................ 428/65.3 |
| 2006/0204791 | A1 * | 9/2006 | Sakawaki et al. .......... 428/828.1 |
| 2006/0222901 | A1 * | 10/2006 | Inamura et al. ............... 428/827 |
| 2006/0222902 | A1 | 10/2006 | Mukai |
| 2007/0231609 | A1 * | 10/2007 | Ajan et al. .................. 428/828.1 |
| 2008/0180843 | A1 * | 7/2008 | Zhang et al. ................... 360/135 |
| 2008/0292909 | A1 | 11/2008 | Igarashi et al. |
| 2009/0052074 | A1 | 2/2009 | Nakagawa et al. |
| 2009/0073599 | A1 * | 3/2009 | Nemoto et al. ............ 360/77.02 |
| 2009/0257144 | A1 * | 10/2009 | Tamai et al. .................... 360/75 |
| 2010/0209741 | A1 * | 8/2010 | Sasaki et al. ............... 428/846.8 |

FOREIGN PATENT DOCUMENTS

| JP | 6103555 A | 4/1994 |
| JP | 63201912 A | 8/1998 |
| JP | 2003016619 A | 1/2003 |
| JP | 2008065879 A | 3/2008 |
| JP | 200908013 A | 4/2009 |
| WO | WO 2006134952 A | 12/2006 |

OTHER PUBLICATIONS

Derwent Abstract Translation of WO 2009/014205 A1 (Derwent Acc-No. 2009-E41621; Patent published Jan. 29, 2009).*

(Continued)

*Primary Examiner* — Kevin Bernatz
(74) *Attorney, Agent, or Firm* — Duft, Bornsen, Fettig LLP

(57) ABSTRACT

Perpendicular magnetic recording (PMR) media and methods of fabricating PMR media are described. The PMR media includes, among other layers, an underlayer, a first onset layer on the underlayer, a second onset layer on the first onset layer, and a perpendicular magnetic recording layer on the second onset layer. The second onset layer has a magnetic moment which is higher than both a magnetic moment of the first onset layer and a magnetic moment of the perpendicular magnetic recording layer.

21 Claims, 4 Drawing Sheets

(56) References Cited

OTHER PUBLICATIONS

Wang et al., "Fabrication and Characterization of Exchange Coupled Composite Media," IEEE Transactions on Magnetics, vol. 43, No. 2, Feb. 2007.

Sonobe et al., "Thermally Stable CGC Perpendicular Recording Media with PT-Rich CoPtCr and Thin PT Layers," IEEE Transactions on Magnetics, vol. 38, No. 5, Sep. 2002.

Jung et al., "CoCrPtO-Based Granular Composite Perpendicular Recording Media," IEEE Transactions on Magnetics, vol. 43, No. 6, Jun. 2007.

* cited by examiner

PERPENDICULAR MAGNETIC RECORDING MEDIA HAVING A DUAL ONSET LAYER

BACKGROUND

1. Field of the Invention

The invention is related to the field of magnetic disk drive systems and, in particular, to perpendicular magnetic recording (PMR) media.

2. Statement of the Problem

One type of recording media presently used in magnetic recording/reproducing apparatuses is longitudinal magnetic recording media. Longitudinal magnetic recording media includes a magnetic recording layer having an easy axis of magnetization parallel (with a random way in two-dimension) to the substrate. The easy axis of magnetization is the crystalline axis that is aligned along the lowest energy direction for the magnetic moment. Another type of recording medium is perpendicular magnetic recording (PMR) media. PMR media includes a magnetic recording layer having an easy axis of magnetization oriented substantially perpendicular to the substrate. Hexagonal Close Packed (HCP) Co-alloys are typically used as the magnetic recording layer for both longitudinal and perpendicular recording. The easy axis of magnetization for these materials lies along the c-axis.

PMR media is generally formed on a substrate with a soft magnetic underlayer (SUL), one or more underlayers, and a perpendicular magnetic recording layer. The soft magnetic underlayer (SUL) serves to concentrate a magnetic flux emitted from a main pole of a write head and to serve as a flux return path back to a return pole of the write head during recording on the magnetic recording layer. The underlayers serve to control the size of magnetic crystal grains and the orientation of the magnetic crystal grains in the magnetic recording layer. The underlayers also serve to magnetically de-couple the SUL and the magnetic recording layer. The magnetic recording layer is the layer in which bits are stored based on the orientation of the magnetization of individual magnetic grains.

Coercivity and signal-to-noise ratio (SNR) of PMR media are related to the magnetic grain separation (as well as magnetic grain size) in the magnetic recording layer. The initial growth of the magnetic recording layer contributes to the degree of isolation between the magnetic grains and to the size of magnetic grains. Although an increase in the isolation between the magnetic grains and a decrease in size of magnetic grain lead to a higher SNR, over-isolation and too-small grain can result in thermal instability of the magnetic recording layer. If the thermal instability is too high, there may be enough thermal energy available during operation to reverse the magnetization within a region of the magnetic recording layer, destroying the data stored within the region. Thus, it would be desirable to increase the isolation between the magnetic grains and reduce the grain size in the magnetic recording layer while controlling the grain isolation and size to maintain thermal stability.

SUMMARY

Embodiments described herein implement dual HCP magnetic oxide onset layers under the magnetic recording layers in PMR media. The use of the dual onset layers enhances the coercivity of the magnetic recording layers as well as controlling grain isolation and size to maintain thermal stability of the magnetic recording layers. The grain isolation and size can be controlled through the changing composition of Cr, oxide in CoCrPt-oxide alloys or of oxide in Ru-oxide alloys.

One embodiment comprises PMR media that includes an underlayer, a first onset layer formed on the underlayer, a second onset layer formed on the first onset layer, and a PMR layer formed on the second onset layer. The first onset layer comprises a first HCP magnetic oxide having a first magnetic moment. The second onset layer comprises a second HCP magnetic oxide having a second magnetic moment, where the second magnetic moment is higher than both the first magnetic moment of the first HCP magnetic oxide and a magnetic moment of the PMR layer.

Another embodiment comprises a method of fabricating PMR media. The method includes forming an underlayer. The method further includes forming a first onset layer on the underlayer, forming a second onset layer on the first onset layer, and forming a PMR layer on the second onset layer. The first onset layer comprises a first HCP magnetic oxide having a first magnetic moment. The second onset layer comprises a second HCP magnetic oxide having a second magnetic moment, where the second magnetic moment is higher than both the first magnetic moment of the first HCP magnetic oxide and a magnetic moment of the PMR layer.

Other exemplary embodiments may be described below.

DESCRIPTION OF THE DRAWINGS

Some embodiments of the present invention are now described, by way of example only, and with reference to the accompanying drawings. The same reference number represents the same element or the same type of element on all drawings.

DESCRIPTION OF THE EMBODIMENTS

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
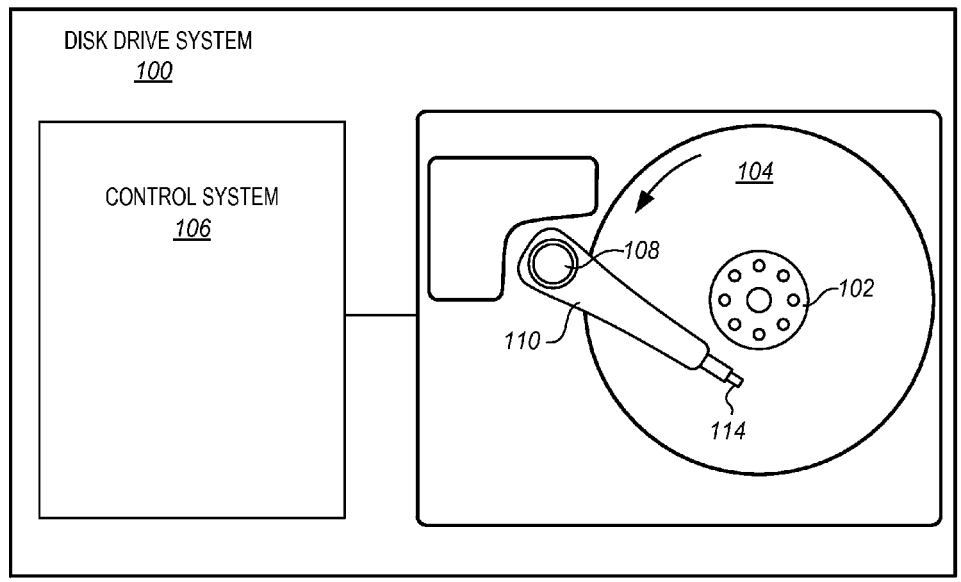
FIG. 1 illustrates a magnetic disk drive system in an exemplary embodiment.

FIG. 1 illustrates a magnetic disk drive system 100 in an exemplary embodiment. Disk drive system 100 includes a spindle 102, a PMR disk 104, a control system 106, an actuator 108, a suspension arm 110, and a slider 114 having an assembly of write and read heads. Spindle 102 supports and rotates PMR disk 104 in a direction indicated by the arrow. A spindle motor (not shown) rotates spindle 102 according to control signals from control system 106. Slider 114 is mounted on suspension arm 110, and actuator 108 is configured to rotate suspension arm 110 in order to position the assembly of write and read heads over a desired data track on PMR disk 104. Disk drive system 100 may include other components not shown in FIG. 1, such as a plurality of PMR disks, actuators, suspension arms, and sliders.

When PMR disk 104 rotates, airflow generated by the rotation of PMR disk 104 causes slider 114 to fly on a cushion of air at a very low elevation (fly height) over the rotating PMR disk 104. As slider 114 flies on the air, actuator 108 moves suspension arm 110 to position a write head (also known as a recording head, not shown) and a read head (not shown) within slider 114 over selected data tracks on PMR disk 104. The write and read heads write data to and read data from, respectively, data tracks on PMR disk 104. Processing circuitry connected to the write and read heads then operates to implement writing and reading functions.

Although PMR disk 104 is shown as a disk in FIG. 1, those skilled in the art will appreciate that PMR media may take on other forms in other embodiments.

Figure 2:
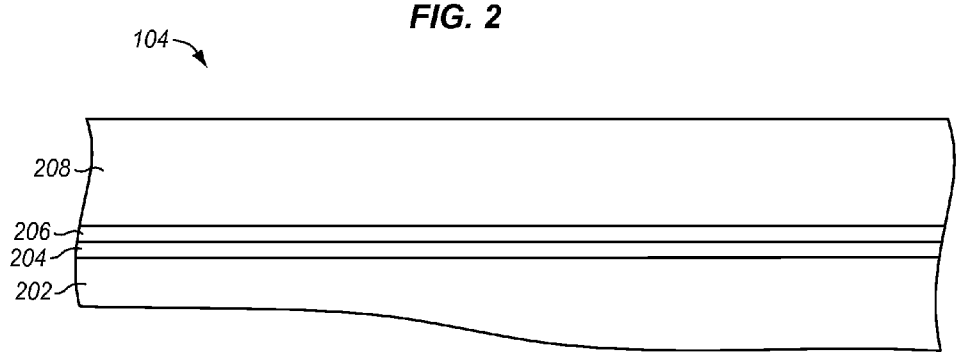
FIG. 2 is a cross-sectional view of a PMR disk in an exemplary embodiment.

FIG. 2 is a cross-sectional view of PMR disk 104 in an exemplary embodiment. FIG. 2 shows just an example of the layers of PMR disk 104, and those skilled in the art will appreciate that more or less layers may be used for PMR disks. In this embodiment, PMR disk 104 includes an underlayer 202, a first onset layer 204, a second onset layer 206, and a PMR layer 208. Underlayer 202 works in conjunction with first onset layer 204 and second onset layer 206 to control the orientation and the magnetic grain separation in PMR layer 208. Generally, coercivity and SNR of PMR media are related to the magnetic grain separation in PMR layer 208. While increasing the magnetic grain separation and reducing grain size in PMR layer 208 lead to higher SNR for PMR disk 104, over-isolation and too-small grain size can result in thermal instability for PMR layer 208. In this embodiment, first onset layer 204 comprises a first HCP magnetic oxide having a first (low) magnetic moment due to a higher oxide and/or Cr composition. Second onset layer 206 comprises a second HCP magnetic oxide having a second (high) magnetic moment to a lower oxide and/or Cr composition, where the second magnetic moment is higher than both the first magnetic moment and a magnetic moment of PMR layer 208. Some examples of the first and the second HCP magnetic oxides include CoCrPt—SiO2, CoCrPt—Ta2O5, CoCrPt—TiO2, etc. A Ru—TiO2 material is used for the first onset layer only. The second magnetic moment of second onset layer 206 and the first magnetic moment of first onset layer 204 operate in conjunction with PMR layer 208 to control the grain isolation and grain size of PMR layer 208. By controlling the grain isolation and grain size of PMR layer 208, thermal stability can be manipulated into an acceptable range for PMR layer 208. An improvement both in the thermal stability and SNR of PMR disk 104 can be achieved by changing thickness and composition of onset layer 204 and onset layer 206.

In this embodiment, PMR layer 208 comprises one or more materials that have an easy axis of magnetization oriented substantially perpendicular to an underlying disk substrate (not shown in FIG. 2). PMR layer 208 is typically formed from a Co-alloy and may contain elements such as Cr and Pt as well as oxides such as $SiO_2$.

Figure 3:
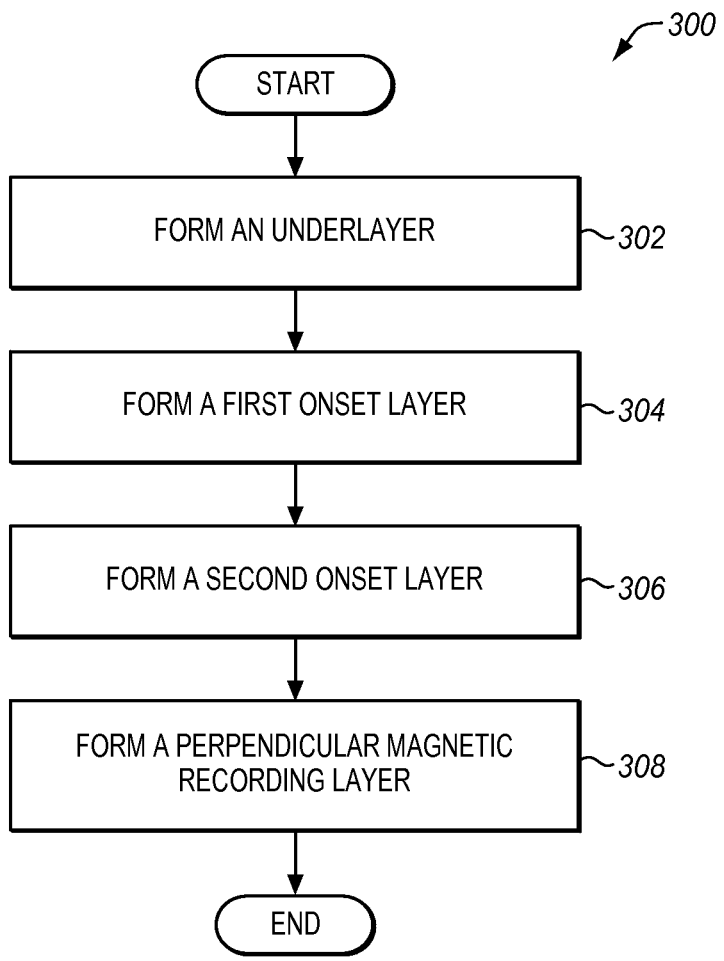
FIG. 3 is a flow chart illustrating a method of fabricating the PMR disk of FIG. 2 in an exemplary embodiment.

FIG. 3 is a flow chart illustrating a method 300 of fabricating PMR disk 104 of FIG. 2 in an exemplary embodiment. Method 300 is not all-inclusive and may therefore include other steps not shown.

Step 302 comprises forming underlayer 202 for PMR disk 104. Step 304 comprises forming first onset layer 204 on underlayer 202. The first onset layer 204 comprises a first HCP magnetic oxide having a first magnetic moment or a Ru-oxide without a magnetic moment. Step 306 comprises forming a second onset layer 206 on first onset layer 204. The second onset layer 206 comprises a second HCP magnetic oxide having a second magnetic moment. Step 308 comprises forming PMR layer 208 on second onset layer 206. In this embodiment, the second magnetic moment of second onset layer 206 is higher than both the first magnetic moment of first onset layer 204 and the magnetic moment of PMR layer 208.

Figure 4:
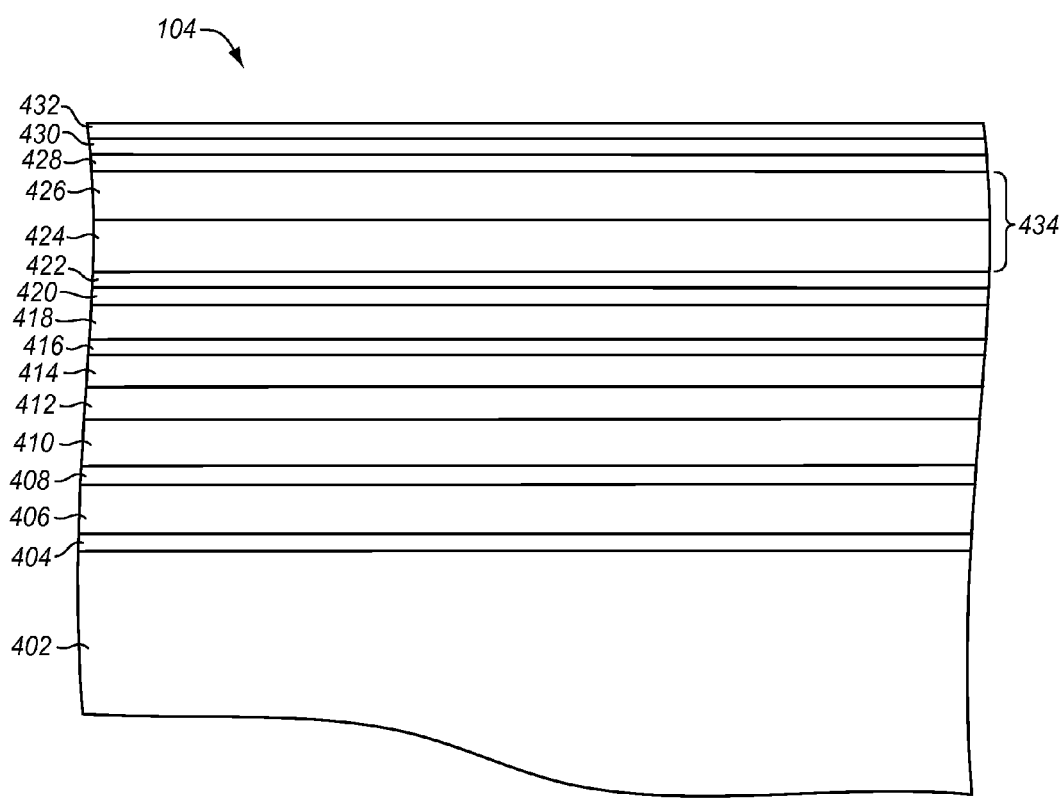
FIG. 4 is a cross-sectional view of a PMR disk in another exemplary embodiment.

FIG. 4 is a cross sectional view of PMR disk 104 in another exemplary embodiment. This embodiment shows detailed layers of PMR disk 104 in just one embodiment, and PMR disk 104 is in no way limited to just this embodiment. PMR disk 104 of FIG. 4 includes a substrate 402 upon which other layers are formed. Substrate 402 may be comprised of a non-magnetic metal, such as aluminum or aluminum alloy, or may be comprised of a non-magnetic material, such as glass, ceramics, silicon, etc. PMR disk 104 further includes an adhesion layer 404. Adhesion layer 404 operates to allow subsequent layers formed on PMR disk 104 to bind to substrate 402. PMR disk 104 further includes a first soft underlayer (SUL) 406, a coupling layer 408, and a second SUL 410. First SUL 406, coupling layer 408, and second SUL 410 operate in conjunction with a write head (e.g., a write head within slider 114 of FIG. 1) to increase the perpendicular field magnitude and improve the field gradient generated by the write head as it passes over PMR disk 104.

PMR disk 104 further includes one or more seed layers 412, a first underlayer 414, a low pressure Ru layer 416, and a second underlayer 418. In some embodiments, second underlayer 418 is formed from high pressure Ru. PMR disk 104 further includes a first onset layer 420 having a first magnetic moment. In this embodiment, first onset layer 420 is formed from a first HCP magnetic oxide of CoPtCr-Oxide, CoCrPtTa-oxide, or CoCrPtX-oxide, where X includes any metal element such as Mo, V, Ru, Pd, etc. The first HCP magnetic oxide may have a concentration of Pt within a range of about 0 to 25 atomic percent and a concentration of Cr within a range of about 20 to 40 atomic percent. First onset layer 420 may also include less than about 20 atomic percent of an oxide, such as one of SiO2, Ta2O5, TiO2, NbP2, CoO, or Co3O4. In other embodiments, the first HCP magnetic oxide comprises various oxides of CoPtCr, CoCrPtTa-oxide, or CoCrPtX-oxide, where X includes any metal element such as Mo, V, Ru, Pd, etc. In some embodiments, first onset layer 420 may comprise a Ru oxide. In embodiments where first onset layer 420 comprises a Ru oxide, the oxide may include less than about 20 atomic percent of TiO2, SiO2, CoO, Ta2O5, or Zr2O5. In addition, the Ru oxide of first onset layer 420 may have a thickness within a range of about 1 to 5 nanometers. PMR disk 104 further includes a second onset layer 422 having a second magnetic moment. In this embodiment, second onset layer 422 is formed from a second HCP magnetic oxide of CoPtCr-oxide, CoCrPtTa-oxide, or CoCrPtX-oxide, where X includes any metal element such as Mo, V, Ru, Pd, etc. The second HCP magnetic oxide may have a concentration of Pt within a range of about 10 to 25 atomic percent and a concentration of Cr within a range of about 10 to 20 atomic percent. In a manner similar to first onset layer 420, second onset layer 422 may also include less than about 20 atomic percent of an oxide, such as one of SiO2, Ta2O5, TiO2, NbO2, CoO, or Co3O4. In addition, second onset layer 422 may comprise various oxides of CoPtCr, CoCrPtTa-oxide, or CoCrPtX-oxide, where X includes any metal element such as Mo, V, Ru, Pd, etc.

In this embodiment, the first magnetic moment of first onset layer 420 is less than about 50 emu/cm$^2$ and the second magnetic moment of second onset layer 422 is within a range of about 400 to 600 emu/cm$^2$. In addition, the thickness of first onset layer 420 and second onset layer 422 may also be within a range of about 0.5 to 5 nanometers.

PMR disk 104 further includes a first magnetic oxide layer 424 and a second magnetic oxide layer 426 which form a PMR layer 434. In this embodiment, the second magnetic moment of second onset layer 422 is higher than both the first magnetic moment of first onset layer 420 and the magnetic moment of the PMR layer 434.

PMR disk 104 further includes an exchange coupling layer 428, a cap layer 430, and an overcoat layer 432. Exchange coupling layer 428 is adapted to control or regulate the exchange coupling between cap layer 430 and PMR layer 434. Cap layer 430 has a lower coercitivy than PMR layer 434. Thus, when a magnetic field is applied to PMR disk 104 to reverse the magnetization of PMR layer 434, the magnetization of cap layer 430 begins to reverse first, which in turn exerts a torque on the magnetization of PMR layer 434 to assist in reversing the magnetization. Overcoat layer 432 protects the underneath layers against damage if, for example, slider 114 of FIG. 1 contacts the surface of PMR disk 104.

Figure 5:
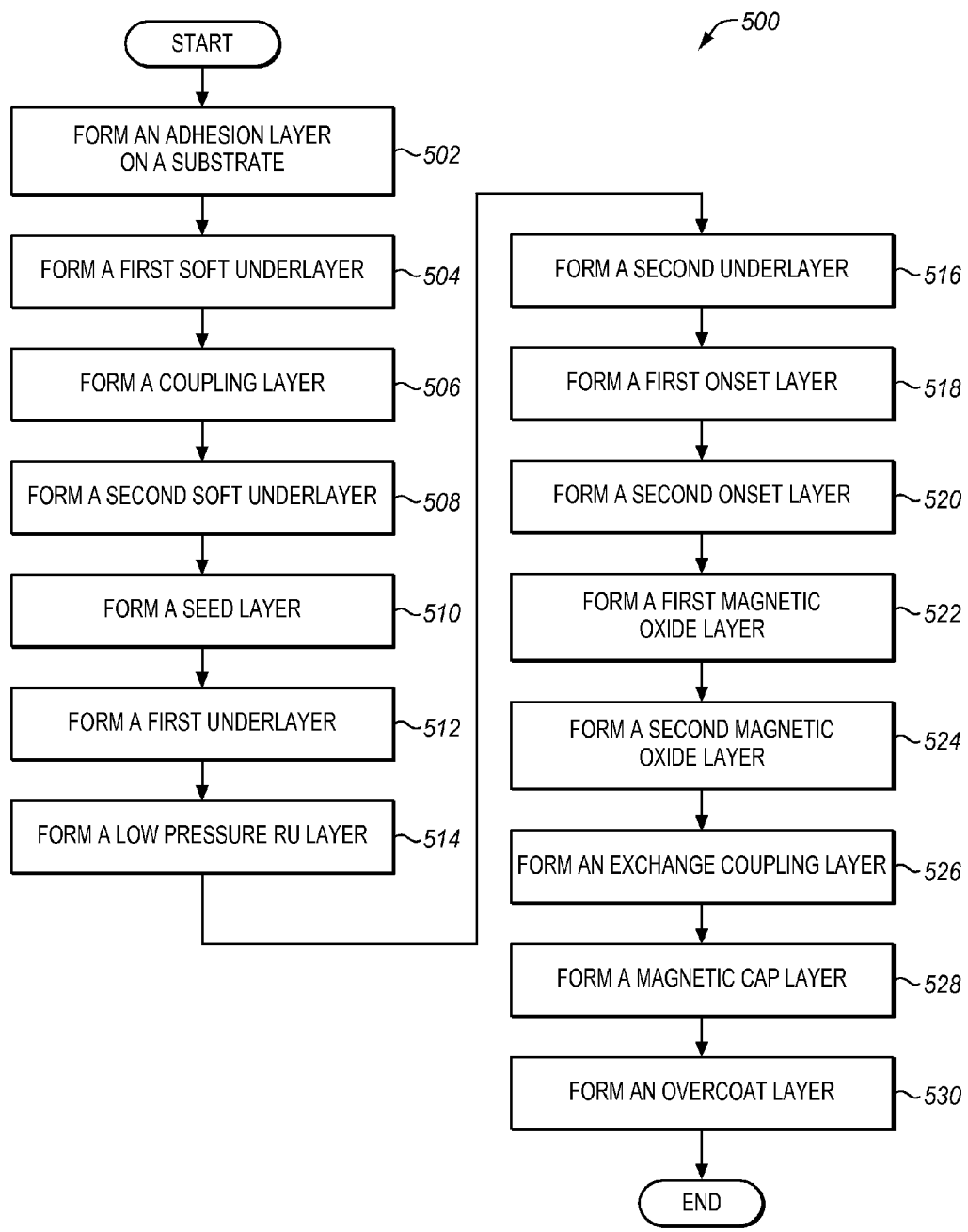
FIG. 5 is a flow chart illustrating a method of fabricating the PMR disk of FIG. 4 in an exemplary embodiment.

FIG. 5 is a flow chart illustrating a method 500 of fabricating PMR disk 104 of FIG. 4 in an exemplary embodiment. The steps of method 500 are not all-inclusive and may include other steps not shown. Step 502 comprises forming adhesion layer 404 on substrate 402. Adhesion layer 404 may comprise AlTi or a similar material. Steps 504, 506, and 508 comprise forming first SUL 406 on adhesion layer 404, forming coupling layer 408 on first SUL 406, and forming second SUL 410 on coupling layer 408, respectively. In addition, first SUL 406 and second SUL 410 may comprise CoFeTaZr, while coupling layer 408 may comprise Ru.

Steps 510, 512, and 514 comprise forming seed layer 412 on second SUL 410, forming first underlayer 414 on seed layer 412, and forming a low-pressure Ru layer 416 on first underlayer 414, respectively. Underlayer 414 may comprise CrTi or similar material. Step 516 comprises forming second underlayer 418 on low-pressure Ru layer 416. In some embodiments, second underlayer 418 is formed from high pressure Ru. Step 518 comprises forming first onset layer 420 on second underlayer 418. First onset layer 420 is formed from a first HCP magnetic oxide having a first magnetic moment. In some embodiments, first onset layer 420 is sputter deposited in a pure argon environment. Step 520 comprises forming a second onset layer 422 on first onset layer 420. Second onset layer 422 is formed from a second HCP magnetic oxide having a second magnetic moment. In some embodiments, second onset layer 422 is sputter deposited in a pure argon environment in a manner similar to first onset layer 420.

Steps 522 and 524 comprise forming first magnetic oxide layer 424 on second onset layer 422, and forming second magnetic oxide layer 426 on first magnetic oxide layer 424, respectively. First magnetic oxide layer 424 and second magnetic oxide layer 426 form PMR layer 434.

Steps 526, 528, and 530 comprise forming exchange coupling layer 428 on second magnetic oxide layer 426, forming cap layer 430 on exchange coupling layer 428, and forming overcoat layer 432 on cap layer 430, respectively. Exchange coupling layer 428 may be formed from a CoRu alloy or a similar material that controls the exchange coupling between cap layer 430 and PMR layer 434.

Although specific embodiments were described herein, the scope of the invention is not limited to those specific embodiments. The scope of the invention is defined by the following claims and any equivalents thereof.

We claim:

1. A perpendicular magnetic recording medium, comprising:
    a soft underlayer;
    an underlayer on the soft underlayer;
    a first onset layer formed on and in contact with the underlayer, wherein the first onset layer comprises a Hexagonal Close Packed (HCP) Ru oxide having a first magnetic moment;
    a second onset layer formed on and in contact with the first onset layer, wherein the second onset layer comprises a HCP magnetic oxide having a second magnetic moment; and
    a perpendicular magnetic recording layer comprising Co-oxide formed on and in contact with the second onset layer, wherein the perpendicular magnetic recording layer has an easy axis of magnetization that is substantially perpendicular to a substrate of the recording medium, and wherein the second magnetic moment is higher than both the first magnetic moment and a magnetic moment of the perpendicular magnetic recording layer.

2. The perpendicular magnetic recording medium of claim 1 wherein:
    the second onset layer formed from the HCP magnetic oxide has a concentration of Pt within a range of about 10 to 25 atomic percent and a concentration of Cr within a range of about 10 to 20 atomic percent, and
    the first onset layer and the second onset layer each include less than about 20 atomic percent of an oxide.

3. The perpendicular magnetic recording medium of claim 2 wherein the first magnetic moment is less than about 50 emu/cm$^2$ and the second magnetic moment is within a range of about 400 to 600 emu/cm$^2$.

4. The perpendicular magnetic recording medium of claim 2 wherein at least one of the first oxide and the second oxide comprises one or more of SiO2, Ta2O5, TiO2, NbO2, CoO, or Co3O4.

5. The perpendicular magnetic recording medium of claim 2 wherein a thickness of the first onset layer and the second onset layer is within a range of about 0.5 to 5 nanometers.

6. The perpendicular magnetic recording medium of claim 1 wherein the Ru oxide of the first onset layer includes less than about 20 atomic percent of TiO2, SiO2, CoO, Ta2O5, or Zr2O5.

7. The perpendicular magnetic recording medium of claim 1 wherein the second onset layer comprise one or more of CoPtCr-oxide, CoCrPtTa-oxide, or CoCrPtX-oxide, where X is a metal element.

8. A magnetic disk drive system, comprising:
    a recording head; and
    a perpendicular magnetic recording medium readable and writable by the recording head, the perpendicular magnetic recording medium comprising:
        a soft underlayer;
        an underlayer on the soft underlayer;
        a first onset layer formed on and in contact with the underlayer, wherein the first onset layer comprises a Hexagonal Close Packed (HCP) Ru oxide having a first magnetic moment;
        a second onset layer formed on and in contact with the first onset layer, wherein the second onset layer comprises a HCP magnetic oxide having a second magnetic moment; and
        a perpendicular magnetic recording layer comprising Co-oxide formed on and in contact with the second onset layer, wherein the perpendicular magnetic recording layer has an easy axis of magnetization that is substantially perpendicular to a substrate of the recording medium, and wherein the second magnetic moment is higher than both the first magnetic moment and a magnetic moment of the perpendicular magnetic recording layer.

9. The magnetic disk drive system of claim 8 wherein:
the second onset layer formed from the HCP magnetic oxide has a concentration of Pt within a range of about 10 to 25 atomic percent and a concentration of Cr within a range of about 10 to 20 atomic percent, and
the first onset layer and the second onset layer each include less than about 20 atomic percent of an oxide.

10. The magnetic disk drive system of claim 9 wherein the first magnetic moment is less than about 50 emu/cm$^2$ and the second magnetic moment is within a range of about 400 to 600 emu/cm$^2$.

11. The magnetic disk drive system of claim 9 wherein at least one of the first oxide and the second oxide comprises one or more of SiO2, Ta2O5, TiO2, NbO2, CoO, or Co3O4.

12. The magnetic disk drive system of claim 9 wherein a thickness of the first onset layer and the second onset layer is within a range of about 1 to 5 nanometers.

13. The magnetic disk drive system of claim 8 wherein the Ru oxide of the first onset layer includes less than about 20 atomic percent of one or more of TiO2, SiO2, CoO, Ta2O5, or Zr2O5.

14. The magnetic disk drive system of claim 8 wherein the second onset layer comprise one or more of CoPtCr-Oxide, CoCrPtTa-oxide, or CoCrPtX-oxide, where X is a metal element.

15. A method of fabricating a perpendicular magnetic recording medium, the method comprising:
forming a soft underlayer;
forming an underlayer on the soft underlayer;
forming a first onset layer on and in contact with the underlayer, wherein the first onset layer comprises a Hexagonal Close Packed (HCP) Ru oxide having a first magnetic moment;
forming a second onset layer on and in contact with the first onset layer, wherein the second onset layer comprises a HCP magnetic oxide having a second magnetic moment; and
forming a perpendicular magnetic recording layer comprising a Co-oxide on and in contact with the second onset layer, wherein the perpendicular magnetic recording layer has an easy axis of magnetization that is substantially perpendicular to a substrate of the recording medium, and wherein the second magnetic moment is higher than both the first magnetic moment and a magnetic moment of the perpendicular magnetic recording layer.

16. The method of claim 15 wherein:
the second onset layer formed from the HCP magnetic oxide has a concentration of Pt within a range of about 10 to 25 atomic percent and a concentration of Cr within a range of about 10 to 20 atomic percent, and
the first onset layer and the second onset layer both include less than about 20 atomic percent of an oxide.

17. The method of claim 16 wherein the first magnetic moment is less than about 50 emu/cm$^2$ and the second magnetic moment is within a range of about 400 to 600 emu/cm$^2$.

18. The method of claim 16 wherein at least one of the first oxide and the second oxide comprises one or more of SiO2, Ta2O5, TiO2, NbO2, CoO, or Co3O4.

19. The method of claim 16 wherein a thickness of the first onset layer and the second onset layer is within a range of about 0.5 to 5 nanometers.

20. The method of claim 15 wherein the Ru oxide of the first onset layer includes less than about 20 atomic percent of one or more of TiO2, SiO2, CoO, Ta2O5, or Zr2O5.

21. The method of claim 15 wherein the second onset layer comprises one or more of CoPtCr-Oxide, CoCrPtTa-oxide, or CoCrPtX-oxide, where X is a metal element.

* * * * *